US011865896B2

(12) United States Patent
Fragoso Iñiguez et al.

(10) Patent No.: US 11,865,896 B2
(45) Date of Patent: Jan. 9, 2024

(54) VEHICLE AIR VENT SYSTEM

(71) Applicant: Ford Global Technologies, LLC, Dearborn, MI (US)

(72) Inventors: Marcos Ahuizotl Fragoso Iñiguez, Neza (MX); Fernando Mayorga Basilio, Gustavo A. Madero (MX); Juan Pablo Jiménez de la Rosa, Coyoacan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 330 days.

(21) Appl. No.: 17/119,092

(22) Filed: Dec. 11, 2020

(65) Prior Publication Data
US 2022/0185063 A1 Jun. 16, 2022

(51) Int. Cl.
*B60H 1/00* (2006.01)
*B60H 1/34* (2006.01)

(52) U.S. Cl.
CPC ....... *B60H 1/00742* (2013.01); *B60H 1/3428* (2013.01); *B60H 2001/3471* (2013.01)

(58) Field of Classification Search
CPC .............. B60H 1/3421; B60H 1/00871; B60H 1/0075; B60H 1/3428; B60H 1/00742; B60H 2001/3464; B60H 2001/3471
See application file for complete search history.

(56) References Cited

U.S. PATENT DOCUMENTS

| | | | |
|---|---|---|---|
| 4,625,329 A * | 11/1986 | Ishikawa ................. | G01S 5/163 382/104 |
| 6,932,695 B1 | 8/2005 | Zielinski et al. | |
| 7,788,008 B2 | 8/2010 | Breed | |
| 9,555,692 B2 | 1/2017 | Shibata et al. | |
| 9,758,042 B2 | 9/2017 | Pryor | |
| 9,862,247 B2 * | 1/2018 | Perkins .............. | B60H 1/00871 |
| 2005/0046377 A1 * | 3/2005 | Hoyle ................ | B60H 1/00857 318/685 |
| 2009/0318069 A1 * | 12/2009 | Konet ................ | B60H 1/00742 454/75 |
| 2010/0120347 A1 | 5/2010 | Gehring et al. | |
| 2010/0330894 A1 | 12/2010 | Alexander et al. | |

(Continued)

FOREIGN PATENT DOCUMENTS

| | | |
|---|---|---|
| JP | 2008195221 | 8/2008 |
| JP | 5805974 | 11/2015 |
| KR | 20090019352 A * | 2/2009 |

OTHER PUBLICATIONS

Translation of KR20090019352, Feb. 2009.*

*Primary Examiner* — Steven S Anderson, II
(74) *Attorney, Agent, or Firm* — Vichit Chea; Price Heneveld LLP

(57) ABSTRACT

A vehicle air vent system includes a dashboard defining an air vent opening. An air register assembly is disposed within the air vent opening of the dashboard. The air register assembly includes a frame and a vane rotatably coupled to the frame. An imager is coupled to the dashboard. The imager captures data within a field of view. A controller is communicatively coupled to the imager and the air register assembly. The controller receives the data from the imager. The controller determines a position of an object within the field of view in response to the data.

17 Claims, 10 Drawing Sheets

(56) References Cited

U.S. PATENT DOCUMENTS

| | | | |
|---|---|---|---|
| 2011/0237176 A1* | 9/2011 | Shibata | B60H 1/3428 |
| | | | 454/330 |
| 2013/0199826 A1 | 8/2013 | Britton et al. | |
| 2014/0326794 A1 | 11/2014 | Frank | |
| 2015/0094861 A1* | 4/2015 | Choi | B60H 1/00985 |
| | | | 700/276 |
| 2018/0170149 A1 | 6/2018 | Fidh | |
| 2018/0208017 A1* | 7/2018 | Hernandez | B60K 37/02 |
| 2019/0176837 A1* | 6/2019 | Williams | B60H 1/00742 |
| 2020/0009944 A1 | 1/2020 | Wilhelmsson | |
| 2020/0148033 A1* | 5/2020 | Skapof | B60K 35/00 |
| 2020/0164722 A1 | 5/2020 | Baker | |
| 2020/0207263 A1 | 7/2020 | Kim | |
| 2020/0376932 A1 | 12/2020 | Nieto et al. | |
| 2021/0396387 A1 | 12/2021 | Apelt et al. | |

* cited by examiner

VEHICLE AIR VENT SYSTEM

FIELD OF THE DISCLOSURE

The present disclosure generally relates to an air vent system. More specifically, the present disclosure relates to an air vent system for a vehicle.

BACKGROUND OF THE DISCLOSURE

Vehicles often include air vents for directing air to passengers within the vehicle. Vents typically direct air from a heating, ventilation, and air conditioning system. The vents may be adjustable to change the direction of airflow through the vents.

SUMMARY OF THE DISCLOSURE

According to at least one aspect of the present disclosure, a vehicle air vent system includes a dashboard defining an air vent opening. An air register assembly is disposed within the air vent opening of the dashboard. The air register assembly includes a frame and a vane rotatably coupled to the frame. An imager is coupled to the dashboard. The imager captures data within a field of view. A controller is communicatively coupled to the imager and the air register assembly. The controller receives the data from the imager. The controller determines a position of an object within the field of view in response to the data.

According to another aspect of the present disclosure, an air vent system for a vehicle includes an air register assembly having a vane rotatably coupled to a frame. The vane is operable between a first angle and a second angle. The frame is operable between a first position and a second position. An actuation assembly operably is coupled to each of the vane and the frame. The actuation assembly adjusts the frame between the first and second positions. The actuation assembly adjusts the vane between the first and second angles. An imager is disposed proximate the air register assembly and defines a field of view. The imager captures image data within the field of view. A controller is communicatively coupled to the imager and the actuation assembly. The controller activates the actuation assembly to adjust at least one of the vane and the frame in response to a position of an object in the image data received from the imager to direct airflow to the object.

According to another aspect of the present disclosure, a method of operating a vehicle air vent system includes detecting a passenger disposed on a seating assembly within a field of view of an imager and calculating an initial position of the passenger. An air register assembly is adjusted to direct airflow to the passenger at the initial position. A subsequent position of the passenger within the field of view is calculated. The air register assembly is adjusted to direct the airflow to the passenger at the subsequent position via an actuation assembly.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
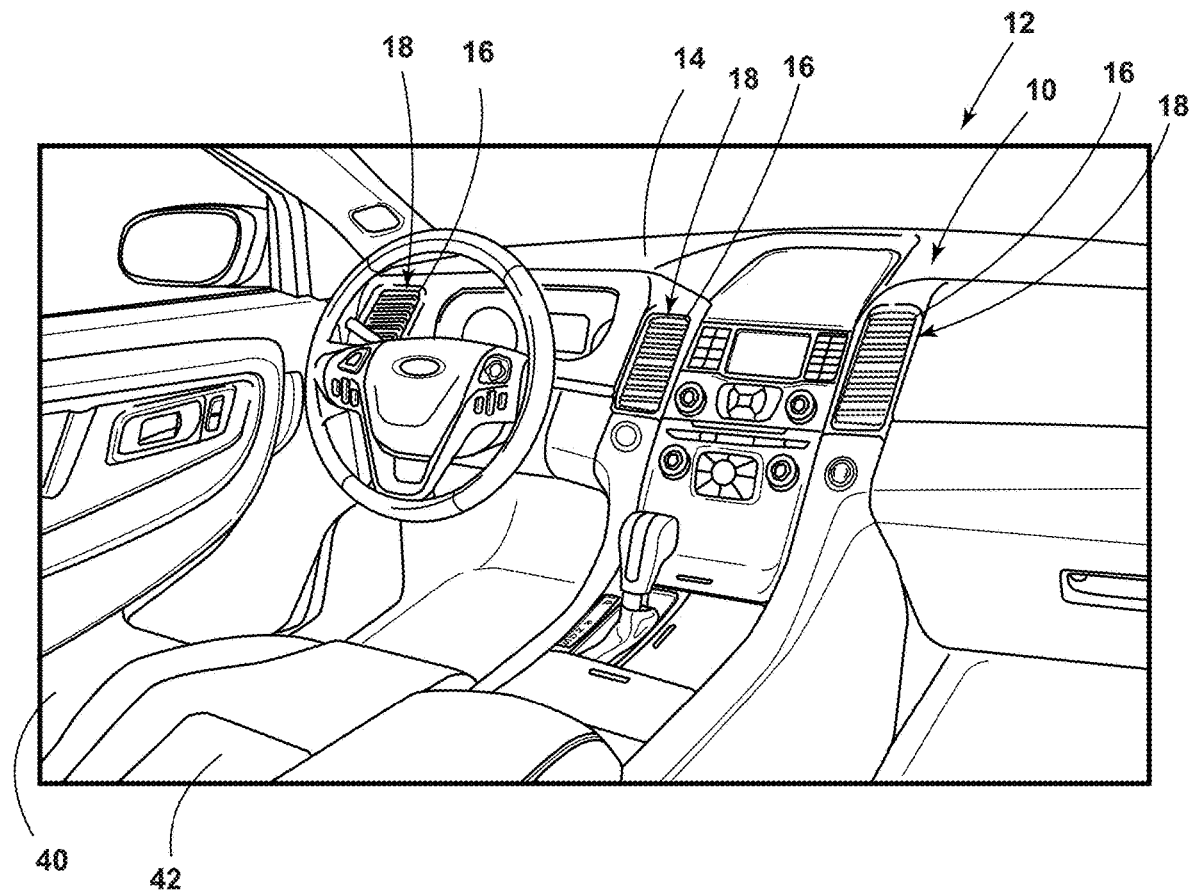
FIG. 1 is a partial front perspective view of a dashboard within an interior compartment of a vehicle having an air vent system, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone;

A and B in combination; A and C in combination; B and C in combination; or A, B, and C in combination.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

With reference to FIGS. 1-12, reference numeral 10 generally designates an air vent system for a vehicle 12 that includes a dashboard 14 defining an air vent opening 16. An air register assembly 18 is disposed within the air vent opening 16 of the dashboard 14. The air register assembly 18 includes a frame and a vane 22 rotatably coupled to the frame 20. An imager 24 is coupled to the dashboard 14. The imager 24 captures data within a field of view 26. A controller 28 is communicatively coupled to the imager 24 and the air register assembly 18. The controller 28 receives the data from the imager 24. The controller 28 determines a position of an object (e.g., a passenger) within the field of view 26 in response to the data.

Referring to FIG. 1, the vehicle 12 includes the interior compartment 40, which includes seating assemblies 42 for supporting passengers of the vehicle 12. The instrument panel or dashboard 14 extends a cross-car direction in a vehicle-forward portion of the interior compartment 40 proximate the seating assemblies 42. The dashboard 14 is generally a panel component constructed of plastic materials. The dashboard 14 defines the air vent openings 16. An outlet of a duct 50 generally aligns with the air vent openings 16 to fluidly couple the interior compartment 40 with a heating, ventilation, and air conditioning (HVAC) system for the vehicle 12. The duct 50 extends from the HVAC system to the dashboard 14 to define an airflow path to the interior compartment 40. The vehicle 12 generally includes multiple air register assemblies 18, with at least one air register assembly 18 disposed in each air vent opening 16 to direct airflow from the HVAC system to the interior compartment 40. The HVAC system generally cleans, cools, heats, regulates, ventilates, and/or dehumidifies air directed into the interior compartment 40. The passenger or other user within the vehicle 12 may utilize the air register assembly 18 to direct air in a certain location or a certain direction to increase the comfort of the passenger.

The vehicle 12 may be a sedan, a sport utility vehicle, a van, a truck, a crossover, other styles of wheeled motor vehicles 12, or other types of vehicles 12. The vehicle 12 may be a manually operated vehicle 12 (e.g., with a human driver), a fully autonomous vehicle 12 (e.g., with no human driver), or a partially autonomous vehicle 12 (e.g., operated with or without a human driver). Additionally, the vehicle 12 may be utilized for personal and/or commercial purposes, such as, ride providing services (e.g., chauffeuring) and/or ride-sharing services.

Figure 2:
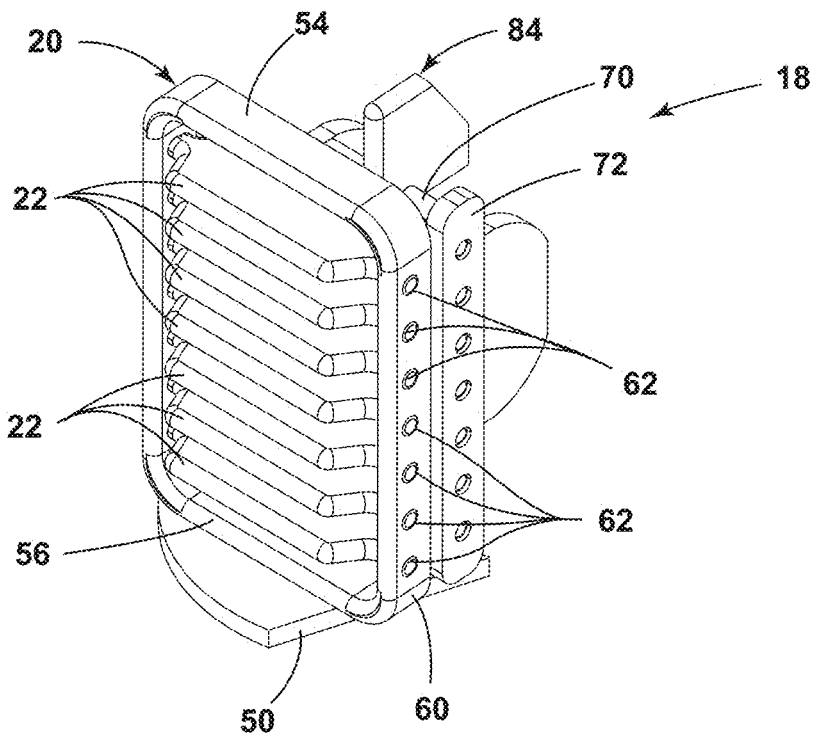
FIG. 2 is a side perspective view of an air register assembly with a portion of a duct, according to the present disclosure.

Referring to FIGS. 1 and 2, the air register assembly 18 is disposed at least partially within the duct 50 proximate the air vent opening 16. A portion of the duct 50 is illustrated in FIG. 2 proximate a bottom of the air register assembly 18. The portion of the duct 50 is illustrated to show the interaction between the duct 50 and the air register assembly 18. However, it is understood that the duct 50 extends around the air register assembly 18. The duct 50 may extend downstream of the air register assembly 18 (e.g., into the interior compartment 40). Accordingly, the air register assembly 18 may be setback from the outlet or air vent opening 16, which may provide space for movement of the air register assembly 18.

The air register assembly 18 rotates between a first position and a second position relative to the duct 50. During rotation, the air register assembly 18 may extend beyond an edge of the duct 50 into the interior compartment 40, or alternatively may not substantially extend beyond the edge of the duct 50. The air register assembly 18 rotates about a central vertical axis to direct air in various cross-car directions. For example, when the air register assembly 18 is in the first position, the air may be directed in a first cross-car direction (e.g., toward a driver side), and when the air register assembly 18 is positioned in the second position, the air may be directed in an opposing, second cross-car direction (e.g., toward a passenger side). The position of the air register assembly 18, and consequently a direction of the airflow extending through the air register assembly 18, may be adjusted by the passenger within the vehicle 12 or may be automatically adjusted.

Referring still to FIG. 2, the air register assembly 18 includes the frame 20, which has a first side 54 arranged generally parallel with the second side 56, and a third side 58 arranged generally parallel to a fourth side 60. The third and fourth sides 58, 60 extend between the first and second sides 54, 56. Corners between each of the first side 54, the second side 56, the third side 58, and the fourth side 60, respectively, are generally rounded, which may assist in smoother rotation of the frame 20 between the first and second positions.

The air register assembly 18 generally includes multiple vanes 22 arranged in a parallel configuration. The vanes 22 extend between and are rotatably coupled to the third and fourth sides 58, 60 of the frame 20. Generally, the vanes 22 extend horizontally. The third and fourth sides 58, 60 of the frame 20 define apertures 62 for receiving the vanes 22 and allowing rotation of the vanes 22 between first and second angles. Generally, the vanes 22 do not extend beyond outer surfaces of the third and fourth sides 58, 60 of the frame 20.

Each vane 22 includes a coupling projection 70 that extends upstream of and proximate to the fourth side 60 of the frame 20. It is contemplated that the coupling projection 70 may be disposed proximate the third side 58 of the frame 20 without departing from the teachings herein. The air register assembly 18 includes a link bar 72 that is disposed upstream of and adjacent to the fourth side 60 of the frame 20. The link bar 72 couples the vanes 22 to one another. In this way, when the user engages at least one of the vanes 22, all of the vanes 22 are rotated simultaneously. In automatic examples, when the link bar 72 is adjusted, all of the vanes 22 are rotated simultaneously. The vanes 22 are operable between the first angle and the second angle, which vertically adjusts the airflow extending through the air register assembly 18. Accordingly, the frame 20 is adjustable between the first and second positions to adjust the airflow in the cross-car direction, and the vanes 22 are adjustable between the first angle and the second angle to adjust the height of the airflow.

Figure 3:
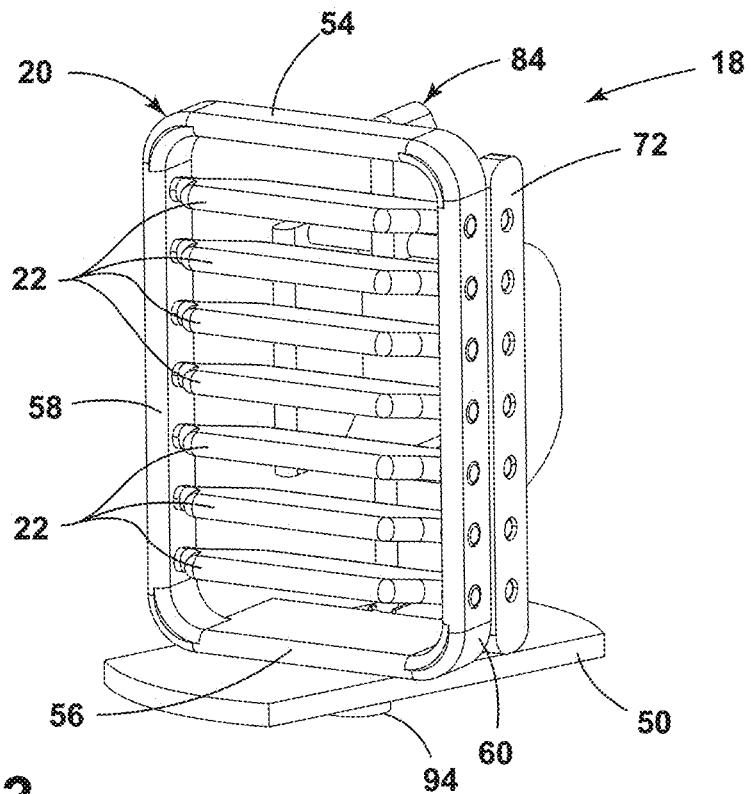
FIG. 3 is a front perspective view of an air register assembly with a portion of a duct, according to the present disclosure.

Referring to FIG. 3, the second side 56 of the frame 20 includes a platform 80 that extends upstream (e.g., into the duct 50, away from the interior compartment 40). A support feature 82 is coupled to and extends from the platform 80. The support feature 82 extends further upstream, away from the vanes 22. A guide assembly 84 includes guide features 86A-86D, collectively referred to herein as guide features 86, which extend vertically or transverse to the vanes 22.

The shape of each guide feature 86 maximizes the rotation of the frame 20 within the duct 50. For example, the guide feature 86A includes a beveled edge 88 to minimize interaction between the guide feature 86A and the duct 50 (FIG. 2). The guide features 86B, 86C have rounded edges 90, which minimizes interaction between the guide features 86B, 86C and the duct 50 as the frame 20 rotates between the first and second positions. Additionally or alternatively, the guide feature 86D, coupled to the support feature 82, is disposed centrally relative to the frame 20 to minimize interaction between the support feature 82 and the guide feature 86D with the duct 50 as the frame 20 rotates within the duct 50. The guide assembly 84 assists in directing air as the frame 20 is adjusted between the first and second positions. Each of the guide features 86 is stationary relative to the frame 20. Accordingly, the guide features 86 are adjusted with the rotation of the frame 20, but not independently from the frame 20. The air register assembly 18 includes the horizontal vanes 22 as well as the vertical guide features 86 for directing airflow into the interior compartment 40.

The guide feature 86A is coupled to both of the guide features 86B, 86C via coupling bars 92. The guide feature 86A is disposed of vertically above the guide feature 86C, 86D, such that a bottom edge of the guide feature 86A is horizontally aligned with a top edge of each of the guide features 86B, 86C. The guide features 86B, 86C are horizontally aligned with one another. Bottom edges of the guide features 86B, 86C are horizontally aligned with a top edge of the guide feature 86D. Accordingly, the guide features 86B, 86C are vertically offset from the guide feature 86A and the guide feature 86D. The guide features 86B, 86C are coupled to the guide feature 86D via additional coupling bars 92. The guide feature 86D is vertically aligned with the guide feature 86A. A bottom edge of the guide feature 86D is coupled to the support feature 82. Accordingly, the engagement between the guide feature 86D and the support feature 82 provides a direct connection between the guide assembly 84 and the frame 20.

Figure 4:
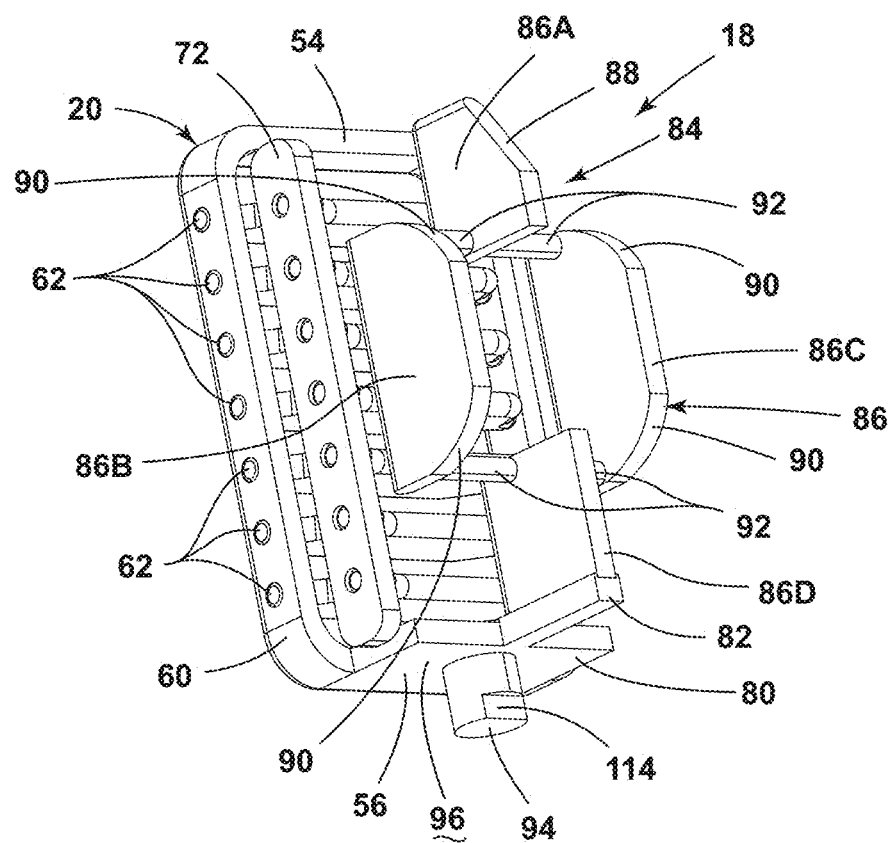
FIG. 4 is a rear perspective view of an air register assembly separated from a duct, according to the present disclosure.
Figure 5:
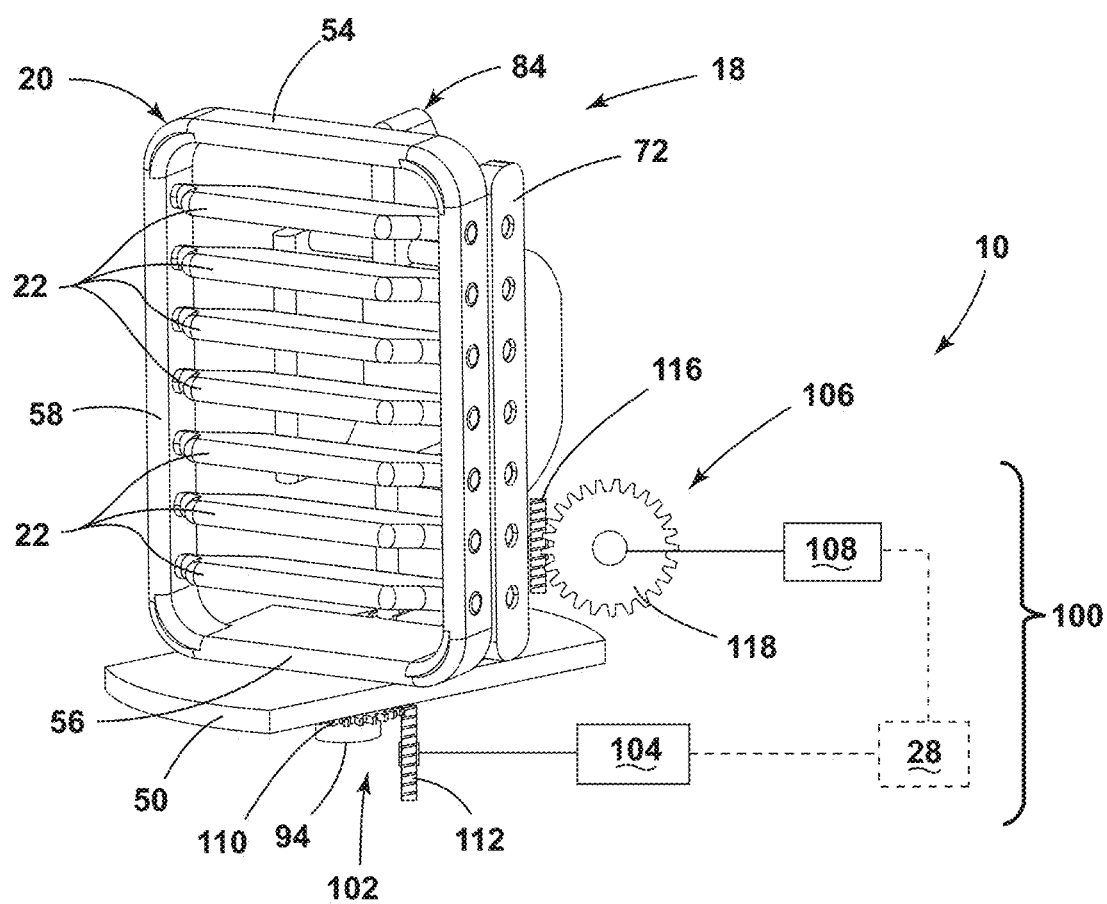
FIG. 5 is a schematic diagram of an actuation assembly operably coupled with an air register assembly, according to the present disclosure.

Referring still to FIG. 3, as well as FIG. 4, the frame 20 includes a shaft 94 that extends from a B-surface 96 of the platform 80. As used herein, the term "B-surface" refers to a surface of any component within the vehicle 12 that is concealed or not contactable by the passenger within the vehicle 12 when the component is in an assembled state. In comparison, the term "A-surface" refers to a surface of any component within the vehicle 12 that is visible or contactable by the passenger within the vehicle 12 when the component is in an assembled state. Accordingly, the shaft 94 extends from a non-contactable, concealed portion of the frame 20. The shaft 94 extends from the second side 56, away from the first side 54, and through the duct 50 (as best illustrated in FIG. 5). The shaft 94 operates as the pivot point allowing the air register assembly 18 to rotate about the vertical axis between the first and second positions.

Referring still to FIG. 4, as well as FIG. 5, the air vent system 10 may include an actuation assembly 100 communicatively coupled with the controller 28 and operably coupled with the air register assembly 18. The actuation assembly 100 includes a frame actuator 102 operably coupled with a first motor 104 and a vane actuator 106 operably coupled with a second motor 108. The frame actuator 102 may have a variety of configurations. As illustrated, the frame actuator 102 includes a first gear 110 operably coupled to the frame 20 and a second gear 112 engaging the first gear 110 and the first motor 104. The shaft 94 of the frame 20 may include a notch 114 defined in a distal end thereof. The first gear 110 may be disposed within the notch 114. The notch 114 may assist in coupling the first gear 110 to the shaft 94 and retaining the engagement as the first gear 110 is adjusted to rotate the shaft 94 and, consequently, the frame 20. The first motor 104 may include a drive shaft, a drive gear, or a similar feature that engages the second gear 112.

In operation, the controller 28 activates the first motor 104. The first motor 104 drives the second gear 112 to rotate or otherwise move. The rotation or movement of the second gear 112 causes rotation or movement of the first gear 110. The first gear 110 then rotates the shaft 94 and the frame 20 between the first and second positions. It is contemplated that the frame actuator 102 may be a gear assembly, a rail assembly, a biasing member, a cam assembly, or other practicable features to rotate the frame 20 about the vertical axis.

The actuation assembly 100 may also include the vane actuator 106. The vane actuator 106 may be coupled to at least one vane 22, the link bar 72, or a combination thereof. The vane actuator 106 may have a variety of configurations. As illustrated, the vane actuator 106 includes a first gear 116 coupled to the link bar 72 and a second gear 118 engaging the first gear 116 and second motor 108. The second motor 108 may have a drive gear, a drive shaft, or other similar feature for driving rotation or movement of the second gear 118.

The vane actuator 106 operates to adjust the vanes 22 between the first angle (e.g., directing air at a first height) and the second angle (e.g., directing air at a second height). The vane actuator 106 rotates each vane 22 about a respective horizontal rotational axis. The first and second gears 116, 118 may be configured as a rack and pinion assembly that operates to vertically adjust the link bar 72. The second motor 108 is operably coupled to the second gear 118 and operates to rotate or otherwise move the second gear 118. The movement of the second gear 118 causes the first gear 116 to move. The first gear 116 is generally coupled to the link bar 72. Accordingly, the movement of the first gear 116 causes the link bar 72 to shift vertically, consequently rotating the vanes 22 between different angles. It is contemplated that the vane actuator 106 may be a gear assembly, a rail assembly, a biasing member, a cam assembly, or other practicable features to adjust the angle of the vanes 22.

Figure 6:
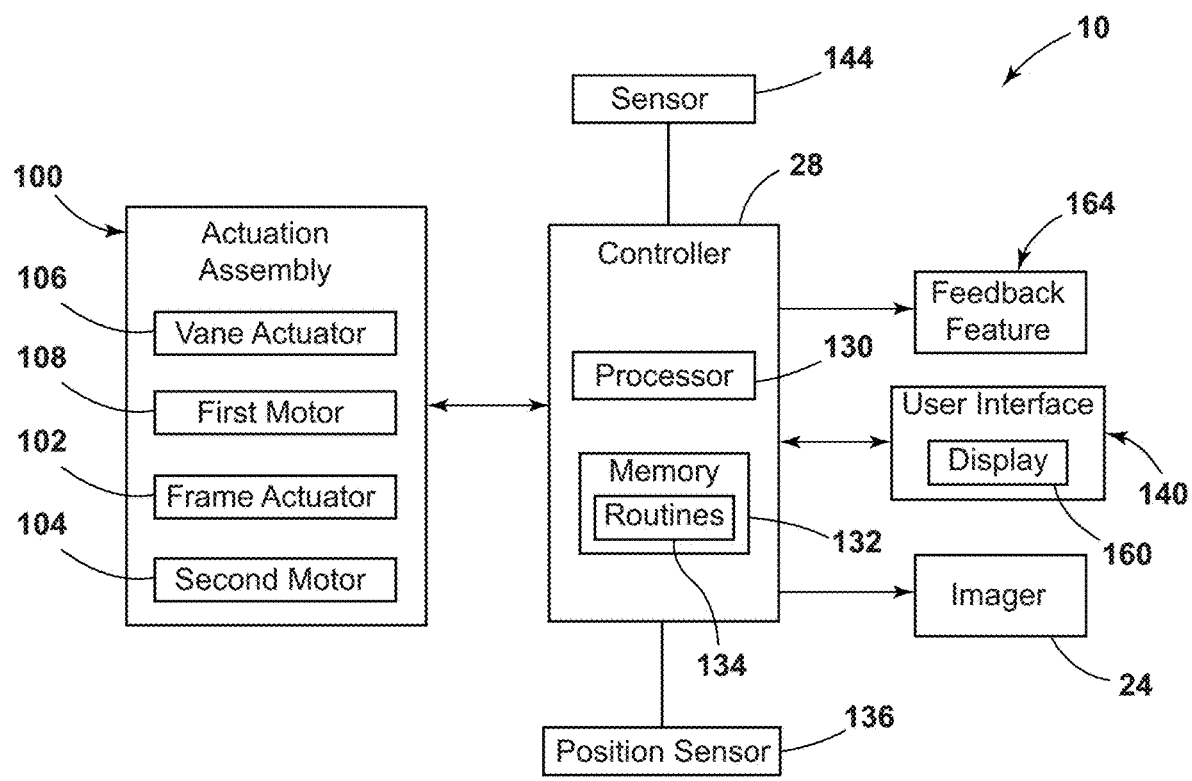
FIG. 6 is a block diagram of a vehicle air vent system, according to the present disclosure.

Referring still to FIG. 5, as well as FIG. 6, the controller 28 adjusts the position of the frame 20 and the position of the vanes 22 via the actuation assembly 100. The controller 28 includes a processor 130, a memory 132, and other control circuitry. Instructions or routines 134 are stored within the memory 132 and executable by the processors 130. The memory 132 may be implemented in a variety of volatile and nonvolatile memory formats. The controller 28 may include various types of control circuitry, digital or analog, and may include the processor 130, a microcontroller, an application specific integrated circuit (ASIC), or other circuitry configured to perform various inputs or outputs, control, analysis, and other functions described herein. The air vent system 10 may include a position sensor 136 for sensing the position or angle of at least one of the frame 20 and the vanes 22. The position sensor 136 provides feedback to the controller 28, assisting in the automatic adjustment of the air register assembly 18. The controller 28 generally includes one or more routines 134 for receiving a signal from the position sensor 136, processing the signal, and producing an output to the signal. The output may be communicating that the air register assembly 18 is in the selected position or that the air register assembly 18 is not in the selected position.

Additionally or alternatively, the output may be an activation of the actuation assembly 100 to adjust the air register assembly 18 to the selected position. The selected position may be provided by a user preference or selection stored within the memory 132, a fully automatic mode of the air register assembly 18 as discussed further herein, a user input through a user interface 140, or a combination thereof. The controller 28 may determine that at least one of the frame 20 and the vanes 22 are not currently in the selected position and may activate the actuation assembly 100 to adjust the frame 20, the vanes 22, or a combination thereof to the selected position. The position sensor 136 may be any practicable sensor or sensor assembly for sensing or detecting the position or angle of the frame 20 and/or the vanes 22, including, but not limited to, inductive sensors, capacitive sensors, variable resistors, Hall-effect sensors, optical sensors, etc.

Referring still to FIG. 6, the controller 28 may optimize airflow volume, rate, and/or temperature in response to a variety of information. For example, the rate or volume of the air flowing through the air vent system 10 may be adjusted based on a user preference stored within the memory 132 or in response to environmental conditions. In another example, the temperature of the air flowing through the air vent system 10 may be adjusted to account for environmental conditions or factors. In various examples, the air vent system 10 generally includes a sensor assembly 144 communicatively coupled with the controller 28. The sensor assembly 144 may include multiple sensors positioned in various locations of the vehicle 12. In certain aspects, the sensor assembly 144 may include a solar load sensor (e.g., a photodiode sensor), an ambient temperature sensor, an interior temperature sensor, and/or a humidity sensor. The controller 28 includes one or more routines 134 for adjusting the volume, rate, and/or temperature of the air provided to the passenger in response to sun load within the vehicle 12, the ambient temperature or humidity proximate to the vehicle 12, the internal temperature within the vehicle 12, or a combination thereof. It is also contemplated that the controller 28 may adjust the position of the frame 20 or the vanes 22 in response to the sensed information received from the sensor assembly 144. It is contemplated that the air vent system 10 may operate in a partially automatic mode when the air vent system 10 factors environmental conditions to adjust the airflow or position of the air register assembly 18 but may not adjust based on the position of the passenger.

Figure 7:
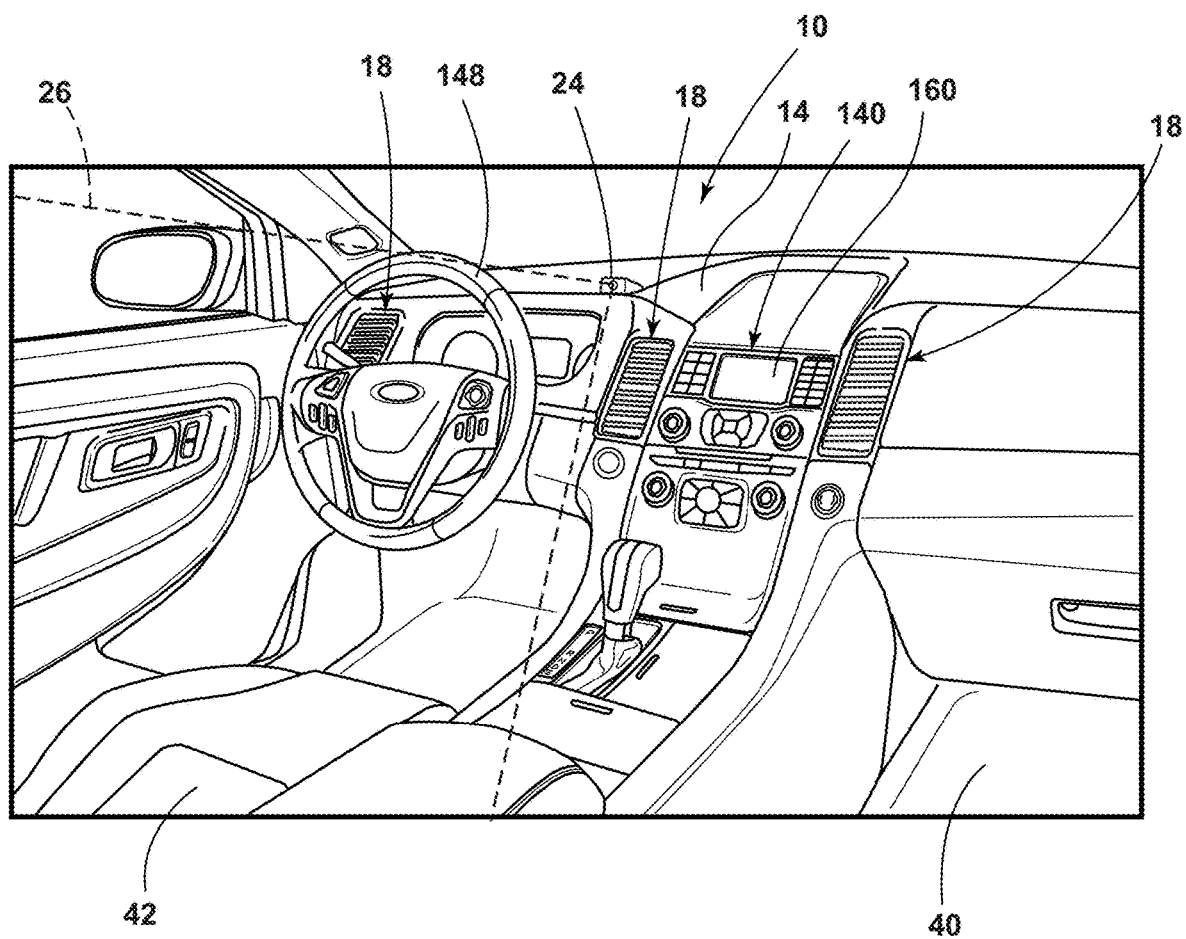
FIG. 7 is a schematic diagram of a field of view of an imager disposed on a vehicle dashboard, according to the present disclosure.

Referring still to FIG. 6, as well as FIG. 7, the air vent system 10 selectively operates in an automatic mode, where the controller 28 adjusts the airflow within the vehicle 12 in response to a user input, a user preference, or sensed information from the sensor assembly 144. Additionally or alternatively, the air vent system 10 selectively operates in the fully automatic mode, where the air register assembly 18 is automatically adjusted based on the position of the passenger as well as in response to the user input, the user preference, and/or the sensed information from the sensor assembly 144.

The air vent system 10 may sense the location of the passenger within the vehicle 12 and adjust the airflow toward the passenger. The air vent system 10 includes the imager 24 coupled to the dashboard 14. In the illustrated configuration in FIG. 7, the imager 24 is disposed on the driver side of the vehicle (e.g., proximate to a driver seat, a steering wheel 148, and at least one air register assembly 18. The imager 24 defines the field of view 26 extending in a vehicle-rearward direction and including at least one seating assembly 42 (e.g., generally the driver seat). The imager 24 may be any practicable type of image-based sensor, such as a charge coupled device (CCD) or a complementary metal oxide semiconductor (CMOS) imager, or any type of color or black-and-white camera.

The imager 24 captures data from within the field of view 26. The data may include image data, such as at least one of a picture, a video, real-time streaming of data, other transmissions of image data, or combinations thereof. The image data may be a single image or multiple images. Additionally or alternatively, the imager 24 may be adjustable. The field of view 26 may also be adjustable to be broader, narrower, positionally shifted, or any combination thereof. The imager 24 may receive a signal from the controller 28 based on the data and/or a user input to adjust an aspect of the imager 24. In various examples, the imager 24 may be adjusted to change the scope of the field of view 26. It is contemplated that the imager 24 includes one or more lenses, which may be adjusted to change the sharpness and/or quality of the data obtained by the imager 24. The data captured by the imager 24 within the field of view 26 is communicated to the controller 28.

It is contemplated that the field of view 26 may include additional seating assemblies 42. In such configurations, the controller 28 may determine the difference between seating assemblies 42 and separately determine the position of the passengers on the seating assemblies 42. It is also contemplated that the air vent system 10 may include additional imagers 24 that operate in a similar manner as described herein. In such configurations, each seating assembly 42 or different areas of the interior compartment 40 (e.g., front seating row, rear seating row, etc.) may be within the field of view 26 of different imagers 24.

Figure 8:
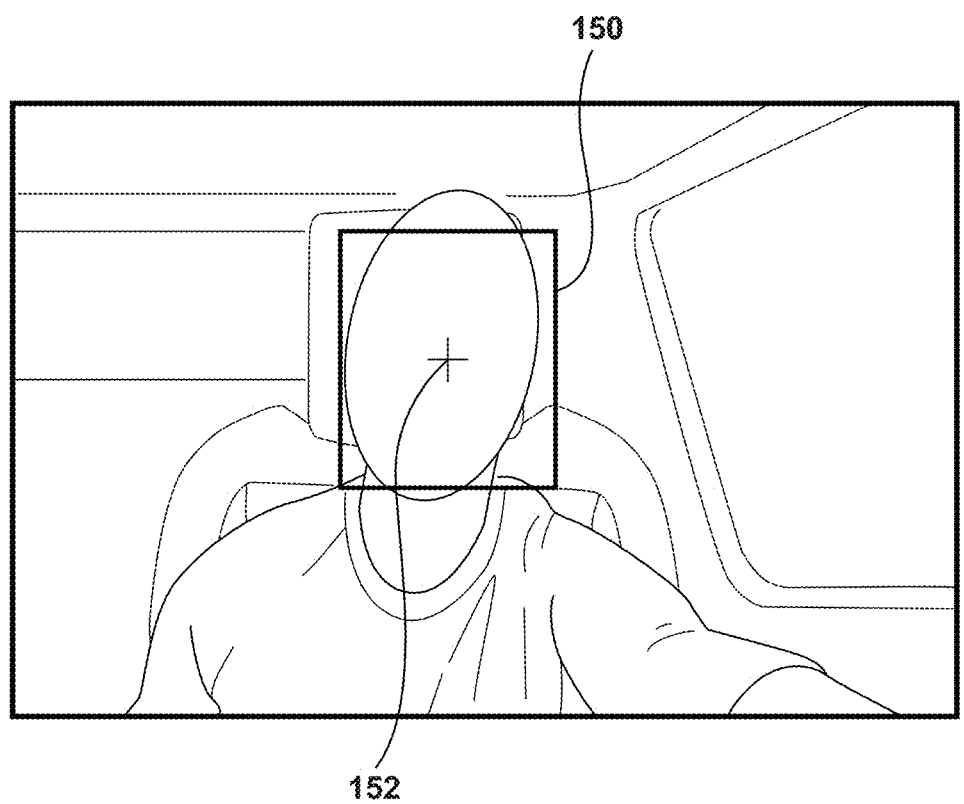
FIG. 8 is schematic diagram of data received from an imager and processed by an air vent system to determine a position of a passenger, according to the present disclosure.

Referring still to FIGS. 6 and 7, as well as FIG. 8, the controller 28 includes one or more routines 134 for receiving the data from the imager 24 and processing the data. The controller 28 determines the position of the passenger (e.g., the object) within the data captured by the imager 24. A graphical example of the data received and processed by the controller 28 is illustrated in FIG. 8. The controller 28 receives the data captured within the field of view 26 of the imager 24. The controller 28 processes the data to determine the position of the passenger within the data. If a passenger is not detected within the data, the controller 28 continues to process subsequently received data until the passenger is detected. Once the controller 28 determines that a passenger is disposed on the seating assembly 42 within the field of view 26 of the imager 24 (e.g., the passenger is detected within the data), the processor 130 utilizes at least one routine 134 to determine an area 150 that generally corresponds with the head of the passenger. The controller 28 also determines a central point 152 within the area 150 that generally corresponds with a center of the head of the passenger. The central point 152 may be a coordinate or position (e.g., including x- and y-positions) or position in the operating envelope determined by the controller 28.

Once the controller 28 determines the position of the head of the passenger, the controller 28 determines whether the air register assembly 18 is positioned to direct air to the central point 152. The controller 28 generally stores information in the memory 132 that correlates the position of the frame 20 and the vanes 22 with different locations within the field of view 26. In this way, the controller 28 may determine whether the airflow is directed in the desired direction or location. The controller 28 may activate the actuation assembly 100 to adjust the air register assembly 18 to the selected location, to direct one to the central point 152 or any point within or on a perimeter of the area 150 based on a user preference.

Referring again to FIGS. 5-8, the controller 28 processes subsequent data received from the imager 24 to determine whether the head of the passenger has moved to a different position within the field of view 26. After the subsequent data has been received, the controller 28 may adjust the position of the area 150 and the central point 152 to track or monitor the position of the head of the passenger. With each change in detected position of the passenger, the controller 28 may adjust the position of the air register assembly 18 to continue to direct the airflow to the central point 152 or another location in the area 150 as determined by the user preference.

The controller 28 may identify the positions of the passenger in relation to one another and/or based on their associated positions within a calibrated coordinate grid and operating envelope of the portion of the interior compartment 40 within the field of view 26. The operating envelope may be defined or programmed into the controller 28 as a predetermined working range defined in relation to the coordinate grid. Utilizing the grid, the controller 28 may determine the position of the head of the passenger and direct the airflow to the selected location relative to the detected position of the head.

Figure 9:
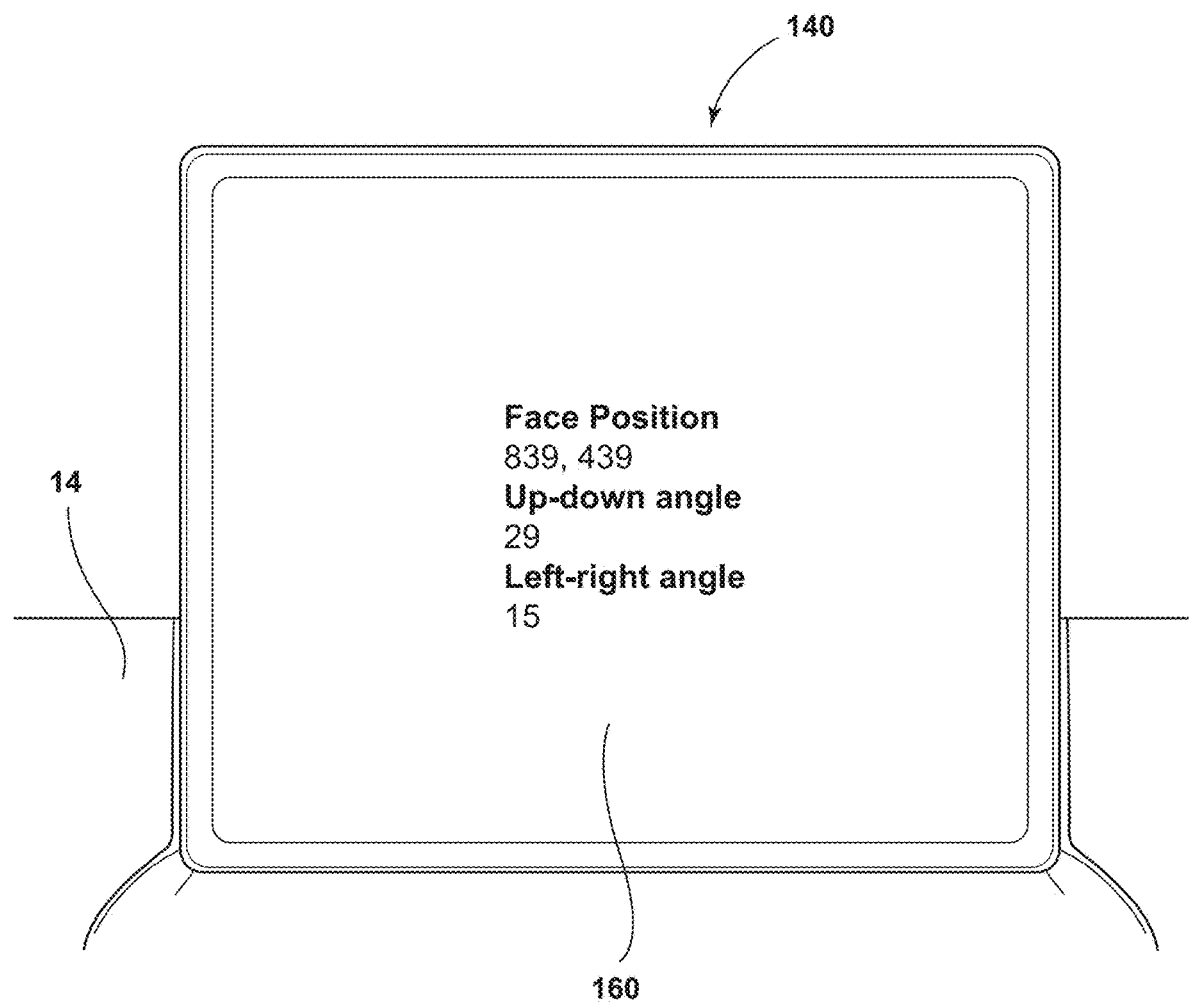
FIG. 9 is an enlarged front elevational view of a user interface on a vehicle dashboard displaying position information, according to the present disclosure.

Referring still to FIG. 6, as well as FIG. 9, the controller 28 is communicatively coupled with the user interface 140. The user interface 140 generally includes a display 160 for visually communicating information to the passenger. The user interface 140 is illustrated in a center stack of the vehicle 12 but may be in any practicable location. The controller 28 includes at least one routine 134 for determining the position of the central point 152 in the coordinated grid (e.g., in the field of view 26), a position of the frame 20 (e.g., a lateral angle), and a position of the vanes 22 (e.g., a vertical angle).

The controller 28 may communicate position information (e.g., the position of the central point 152, the lateral angle, and/or the vertical angle) to the user interface 140, and the user interface 140 may convey the position information of the air register assembly 18 via the display 160. Displaying the position information allows the user to receive visual feedback of the position that may provide a personalized or optimized airflow within the vehicle 12. The passenger or user may view the position information on the display 160 and determine whether the air register assembly 18 is in the same position in the future.

Figure 10:
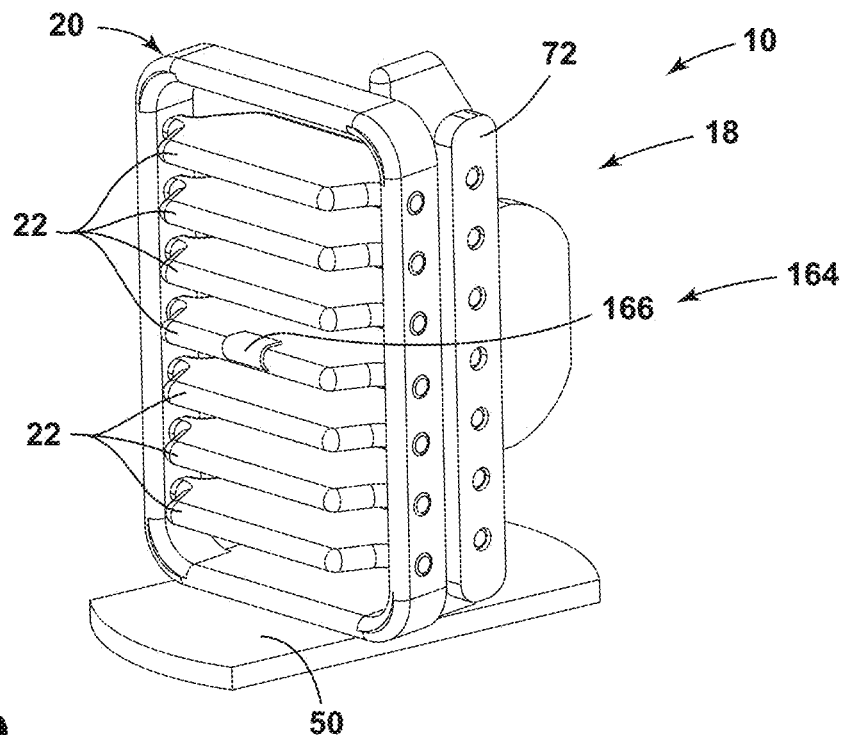
FIG. 10 is a side perspective view of an air register assembly having an indicator light, according to the present disclosure.

Referring to FIG. 10, the air register assembly 18 may include a feedback feature 164 for providing visual feedback to the passenger that the air register assembly 18 is in the desired or selected position. The feedback feature 164 may include an indicator light 166 coupled to or integrally formed with at least one of the vanes 22. The indicator light 166 may be illuminated by the controller 28 when the air vent assembly 18 is in the selected position. The selected position may include at least one of the position of the frame 20 and the angle of the vanes 22. Generally, the selected position optimizes the airflow condition for the passenger relative to the area 150. For example, the selected position may be an optimized airflow directly on the passenger (e.g., the central point 152). The indicator light 166 may illuminate when the airflow is directed to the central point 152. Alternatively, if the user preferences stored within the memory 132 indicate that the passenger prefers airflow adjacent to central point 152, the indicator light 166 is illuminated when the airflow is directed at the user defined position adjacent to the central point 152.

The indicator light 166 provides feedback to the passenger to confirm the selected position of the air register assembly 18 without viewing the user interface 140 or another indicator on the dashboard 14. For example, the indicator light 166 may be illuminated by the controller 28 when the actuation assembly 100 adjusts the air register assembly 18 in response to movement of the passenger. The controller 28 may sense the position of the air register assembly 18 through the position sensor 136, another sensor, or user input to confirm the selected position and activate the indicator light 166. The indicator light 166 may also illuminate to indicate the air vent system 10 is operating in the fully automatic mode.

Figure 11:
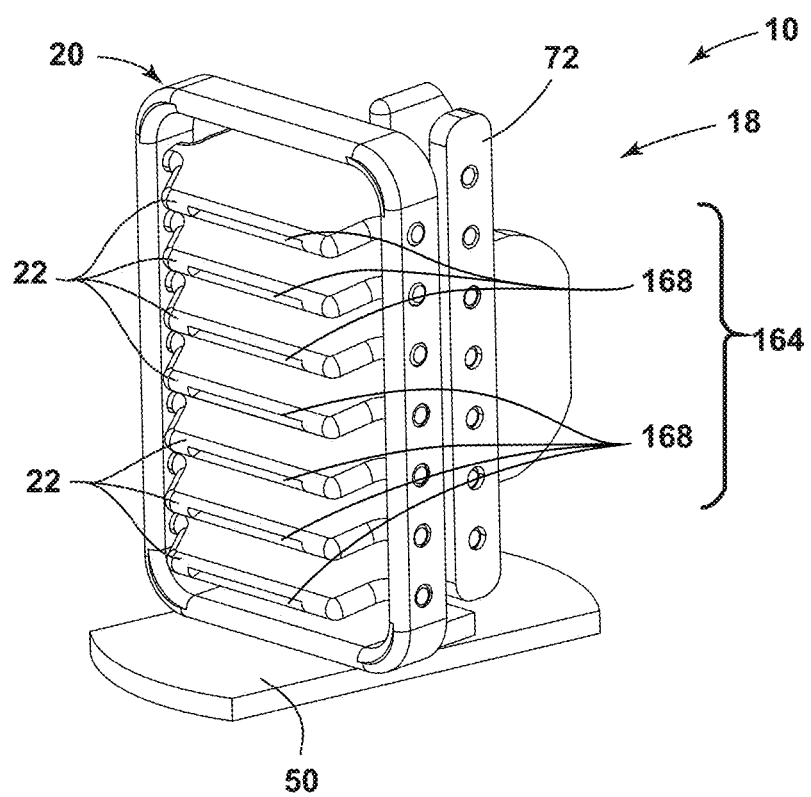
FIG. 11 is a side perspective view of an air register assembly having multiple indicator lights, according to the present disclosure.

Referring to FIG. 11, the feedback feature 164 may include indicator lights 168 coupled to or integrally formed with each vane 22 (e.g., one indicator light 168 per vane 22). The indicator lights 168 may illuminate when the vanes 22 are at a predefined angle. Generally, the predefined angle is an open position allowing airflow through the air register assembly 18. Additionally or alternatively, the indicator lights 168 may illuminate when the vehicle 12 is started. When integrally formed with the vanes 22, the illuminated indicator lights 168 may be visible to the passenger when the vanes 22 are in the open position and may not be visible (e.g., may be obscured) when the vanes 22 are in a closed position that prevents airflow through the air register assembly 18. Accordingly, indicator lights 168 provide feedback on whether air is traveling through the air register assembly 18. The indicator lights 168 may also illuminate to indicate the air vent system 10 is operating in the fully automatic mode. Accordingly, the indicator light 166 may provide visual feedback to the passenger that the air vent system 10 may auto adjust the airflow without further input from the passenger. Further, it is contemplated that the indicator light 168 may be used in combination with or independently of the indicator light 166.

Figure 12:
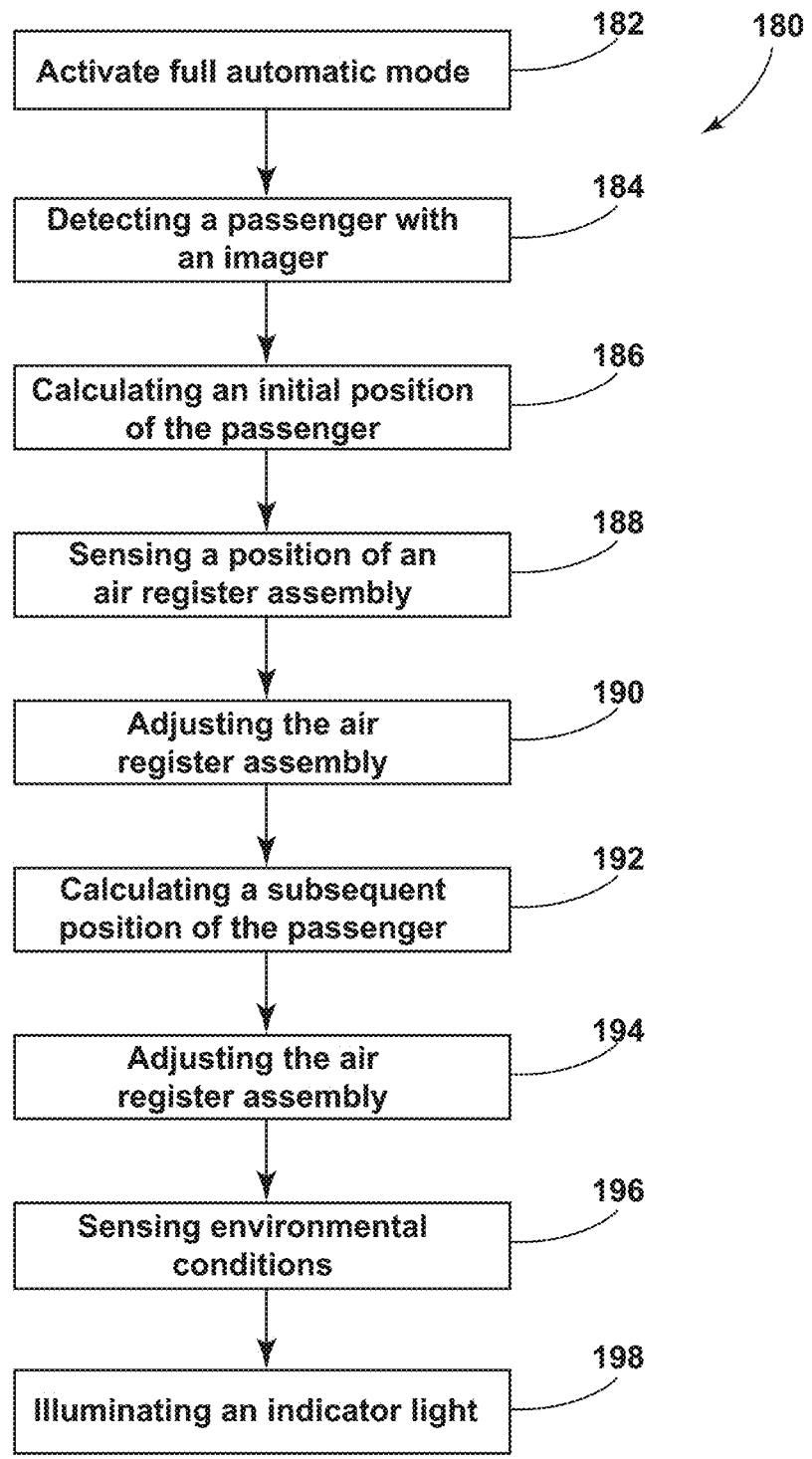
FIG. 12 is a flow diagram of a method of operating a vehicle air vent system, according to the present disclosure.

Referring to FIG. 12, as well as FIG. 1-11, a method 180 of operating the air vent system 10 includes step 182 of activating the fully automatic mode of the air vent system 10. The fully automatic mode may be a default condition of the air vent system 10 when the vehicle 12 is started. Additionally or alternatively, the fully automatic mode may be selectively activated and deactivated by the user through the user interface 140. The fully automatic mode may be adjusted through a touch feature, a button or toggle, a voice command, etc.

In step 184, the position of the passenger is detected using the imager 24. The imager 24 is activated by the controller 28, which may occur automatically with the start of the vehicle 12, with the activation of the fully automatic mode, or upon user activation. The imager 24 collects data within the field of view 26 and communicates the data to the controller 28. The imager 24 may capture data continuously or periodically to capture data relating to movement of the passenger.

In step 186, the controller 28 calculates the position of the passenger in the seating assembly 42 using the data received from the imager 24. As previously mentioned, the controller 28 may utilize a coordinating grid and/or operating envelope to calculate the position of the passenger. The controller 28 detects the area 150 that corresponds with the head of the passenger, as well as the central point 152 in the area 150. In step 188, the position of the air register assembly 18 is sensed by the position sensor 136. The position sensor 136 sends a signal to the controller 28 corresponding to the position of at least one of the frame 20 and the vanes 22. The position information corresponds with the lateral angle of the frame 20 (e.g., a cross-car direction) and/or the vertical angle of the vanes 22 (e.g., a height).

In step 190, the controller 28 utilizes the area 150 and the central point 152 calculated in step 186 and the position information sensed in step 188 to determine a direction and/or location to direct the airflow. Additionally or alternatively, the controller 28 may determine a position of the frame 20 and the vanes 22 that supplies air to the selected location. In step 190, the controller 28 adjusts the air register assembly 18 to direct air to the selected location. The controller 28 activates the first and second motors 104, 108 to drive the frame actuator 102 and the vane actuator 106, respectively. The actuation assembly 100 drives the frame 20 and the vanes 22 until the position sensed by the position sensor 136 corresponds with the position that directs the airflow to the selected location.

The controller 28 may store information in the memory 132 that correlates a position of the frame 20 and a position of the vanes 22 with various locations within the interior compartment 40 and/or relative to the field of view 26 of the imager 24. Accordingly, when the controller 28 determines that the frame 20 and the vanes 22 are in certain positions based on the sensed information, the controller 28 may correlate the position information with the location or direction of the airflow. This information allows the controller 28 to determine how to adjust the air register assembly 18 to provide the selected airflow trajectory.

In step 190, the controller 28 may reference user preferences stored within the memory 132 to adjust the actuation assembly 100 to the preferred position. For example, if the passenger prefers that the airflow be directed on his or her face, the controller 28 directs the airflow to the central point 152, which corresponds with airflow directly to the passenger. Alternatively, the passenger may prefer indirect airflow, which may correspond to a point on the periphery of the area 150. In such examples, the controller 28 directs air to the periphery of the area 150 when adjusting the air register assembly 18. The location the airflow is directed by the air vent system 10 may differ based on the user preferences. Each adjustment of the air register assembly 18 may account for the user preferences.

In step 192, the controller 28 may calculate a subsequent position of the passenger within the field of view 26. As the imager 24 continues to transmit data captured from the field of view 26, the controller 28 may determine a change in the position of the passenger. The change in position may be determined by comparing the data with the previous data and/or the operating envelope. When the change in position is determined, the controller 28 may recalculate the area 150 and the central point 152 in response to the more recent data. The recalculation of the position of the passenger may be accomplished in a similar manner as the initial calculation in step 186.

In step 194, similar to step 188 and step 190, the controller 28 may receive sensed information from the position sensor 136 and determine the position of the air register assembly 18. The controller 28 may then compare the current position of the air register assembly 18 and the direction of the airflow to the area 150 and the central point 152 calculated in step 192. If the airflow is not being directed at the more recently calculated area 150, the controller 28 activates the actuation assembly 100 to adjust the air register assembly 18 to direct air at the area 150 once again.

Similar to step 190, in step 194, the controller 28 may adjust the air register assembly 18 to adjust the airflow to the same point relative to the passenger (e.g., the central point 152, the point on the periphery of the area 150, etc.) when the passenger adjusts his or her position. In this way, the air vent system 10 may provide personalized and optimized airflow to the passenger as the passenger adjusts on the seating assembly 42. The controller 28 may store multiple user preferences, which can be selected through the user interface 140.

In step 196, the environmental condition within and adjacent to the vehicle 12 may be sensed by the sensor assembly 144. The sensor assembly 144 may sense sun load, ambient temperature, internal temperature, and/or humidity. The environmental conditions may affect the comfort of the passenger in the vehicle 12. Accordingly, the volume and rate of air, the temperature of the air, and/or the direction of the air relative to the passenger may be adjusted by the controller 28 in response to the sensed information to maximize the comfort of the passenger.

In step 198, the feedback feature 164 may be activated when the air register assembly 18 is in the selected position that maximizes the comfort of the passenger. For example, when the air register assembly 18 is in the selected position to direct air at the central point 152 and/or the volume or rate of airflow is optimized based on the sensed information or the user preferences, the feedback feature 164 may indicate the optimal conditions of the air vent system 10 have been reached. The feedback feature 164 provides visual feedback that the conditions are optimized for the passenger without the passenger viewing the user interface 140 or another indicator on the dashboard 14. It will be understood that the steps of the method 180 may be performed in any order, simultaneously and/or omitted without departing from the teachings provided herein.

Referring to FIGS. 1-12, the air register assembly 18 provides for directed airflow into the interior compartment 40 of the vehicle 12. The vanes 22 vertically adjust the airflow, while the frame 20 horizontally adjusts the airflow. Additionally or alternatively, the air register assembly 18 may be in communication with the actuation assembly 100 to automatically adjust the position of at least one of the vanes 22 and the frame 20. Within the vehicle 12, various features (e.g., steering wheel 148, etc.) may hinder airflow from the air register assemblies 18, and the air vent system 10 allows the passenger to adjust the air register assemblies 18 to maximize the airflow to provide an optimized experience. The controller 28 may track or monitor the position of the passenger within the field of view 26 of the imager 24. The controller 28 may adjust the air register assembly 18 to direct air to the selected location relative to the passenger. In this way, the airflow may follow the passenger as the passenger adjusts positions within the field of view 26.

Use of the present device may provide for a variety of advantages. For example, the air register assembly 18 may direct air into the interior compartment 40. Further, the controller 28 may activate the actuation assembly 100 to automatically adjust the position of the frame 20 and/or the vanes 22. Also, the automatic adjustment of the air register assembly 18 may allow the air register assembly 18 to adjust based on the position of the passenger. Further, when operating in the fully automatic mode, the air vent system 10 provides an optimized experience regardless of the position of the passenger within the field of view 26.

Moreover, the air register assembly 18 may include the feedback feature 164. The air register assembly 18 may include the indicator light 166, which may illuminate when the air register assembly 18 is in the selected position. Further, the air register assembly 18 may include the indicator lights 168, which may provide visual feedback to the passengers that the air register assembly 18 is allowing airflow to travel through the air register assembly 18 and into the interior compartment 40. Additionally, the various features providing visual feedback allow the passenger to maximize comfort and internal temperature within the vehicle 12. Additional benefits or advantages may be realized and/or achieved.

According to various examples, a vehicle air vent system includes a dashboard defining an air vent opening. An air register assembly is disposed within the air vent opening of the dashboard. The air register assembly includes a frame and a vane rotatably coupled to the frame. An imager is coupled to the dashboard. The imager captures data within a field of view. A controller is communicatively coupled to the imager and the air register assembly. The controller receives the data from the imager. The controller determines a position of an object within the field of view in response to the data. Embodiments of the present disclosure may include one or a combination of the following features:

- an actuation assembly operably coupled to the frame and the vane, wherein the actuation assembly adjusts the vanes between a first angle and a second angle and adjusts the frame between a first position and a second position in response to a signal from the controller;
- an air register assembly is adjusted via the actuation assembly from an initial position to a subsequent position in response to the position of the object within the field of view;
- a controller determines a subsequent position of the object within the field of view, wherein the controller activates the actuation assembly to adjust at least one of the vane and the frame in response to the subsequent position;
- a user interface communicatively coupled to the controller, wherein the user interface displays position information corresponding to at least one of a current position of the vane and a current position of the frame;
- position information includes a lateral angle of the frame and a vertical angle of the vane;
- a sensor communicatively coupled to the controller, wherein the sensor senses at least one of sun load, ambient temperature, and interior temperature within an interior compartment;
- a position sensor communicatively coupled to the controller and operably coupled to the air register assembly, wherein the position sensor senses a position of at least one of the frame and the vane; and
- an imager is coupled to the dashboard proximate a steering wheel, wherein the field of view includes a driver seat.

According to various examples, an air vent system for a vehicle includes an air register assembly having a vane rotatably coupled to a frame. The vane is operable between a first angle and a second angle. The frame is operable between a first position and a second position. An actuation assembly operably is coupled to each of the vane and the frame. The actuation assembly adjusts the frame between the first and second positions. The actuation assembly adjusts the vane between the first and second angles. An imager is disposed proximate the air register assembly and defines a field of view. The imager captures image data within the field of view. A controller is communicatively coupled to the imager and the actuation assembly. The controller activates the actuation assembly to adjust at least one of the vane and the frame in response to a position of an object in the image data received from the imager to direct airflow to the object. Embodiments of the present disclosure may include one or a combination of the following features:

- a controller determines a change in position of the object in response to the image data;
- a controller activates the actuation assembly in response to the change in position of the object, wherein the actuation assembly adjusts the air register assembly to direct the airflow to the object disposed in a subsequent position;
- a controller stores a predefined user selection, wherein the air register assembly is adjusted in response to the predefined user selection;
- a user interface communicatively coupled to the controller, wherein the user interface displays position information for at least one of the vane and the frame;
- an indicator light coupled to the vane, wherein the controller activates the indicator light when the vane is at a predefined angle; and
- a sensor communicatively coupled to the controller, wherein the sensor senses at least one of sun load, ambient temperature, and interior temperature within said vehicle.

According to various examples, a method of operating a vehicle air vent system includes detecting a passenger disposed on a seating assembly within a field of view of an imager and calculating an initial position of the passenger. An air register assembly is adjusted to direct airflow to the passenger at the initial position. A subsequent position of the passenger within the field of view is calculated. The air register assembly is adjusted to direct the airflow to the passenger at the subsequent position via an actuation assembly. Embodiments of the present disclosure may include one or a combination of the following features:

- adjusting the air register assembly includes adjusting at least one of a vane and a frame of the air register assembly;
- sensing at least one of a sun load, an ambient temperature, and interior temperature within an interior compartment; and
- illuminating an indicator light when at least one of a vane of the air register assembly is at a predefined angle and a frame of the air register assembly is at a predefined position.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The various illustrative logical blocks, modules, controllers, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine, or the like. A processor may also be implemented as a combination of computing devices, e.g., a combination of a DSP and a microprocessor, a plurality of microprocessors, one or more microprocessors in conjunction with a DSP core, or any other such configuration.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle air vent system, comprising:
   a dashboard defining an air vent opening;
   an air register assembly disposed within the air vent opening of the dashboard, wherein the air register assembly comprises:
     a frame having a platform on a bottom side of the frame;
     a shaft coupled to the platform and extending outward from the platform, the shaft configured to permit rotation of the frame about a vertical axis defined by the shaft between a first position and a second position; and
     a vane rotatably coupled to the frame; and
   an imager coupled to the dashboard, wherein the imager captures data within a field of view;
   a controller communicatively coupled to the imager and the air register assembly, wherein the controller receives the data from the imager, and wherein the controller determines a position of an object within the field of view in response to the data; and
   an actuation assembly operably coupled to the frame and the vane, wherein the actuation assembly adjusts the vane between a first angle and a second angle and adjusts the frame between the first position and the second position in response to a signal from the controller, and wherein the controller is configured to determine an area that corresponds with the object, and wherein the controller activates the actuation assembly to adjust at least one of the vane and the frame in response to a user-selected position in the area to direct airflow to the user-selected position in the area.

2. The vehicle air vent system of claim 1, wherein the air register assembly is adjusted via the actuation assembly from an initial position to a subsequent position in response to the position of the object within the field of view.

3. The vehicle air vent system of claim 1, wherein the controller determines a subsequent position of the object within the field of view, and wherein the controller activates the actuation assembly to adjust at least one of the vane and the frame in response to the subsequent position.

4. The vehicle air vent system of claim 1, further comprising:
   a user interface communicatively coupled to the controller, wherein the user interface displays position information corresponding to at least one of a current position of the vane and a current position of the frame.

5. The vehicle air vent system of claim 1, further comprising:
   a sensor communicatively coupled to the controller, wherein the sensor senses at least one of sun load, ambient temperature, and interior temperature within an interior compartment.

6. The vehicle air vent system of claim 1, further comprising:
   a position sensor communicatively coupled to the controller and operably coupled to the air register assembly, wherein the position sensor senses a position of at least one of the frame and the vane.

7. The vehicle air vent system of claim 1, wherein the imager is coupled to the dashboard proximate a steering wheel, and wherein the field of view includes a driver seat.

8. The vehicle air vent system of claim 1, wherein the controller determines a subsequent position of the user-selected position within the field of view, and wherein the controller activates the actuation assembly to adjust at least one of the vane and the frame in response to the subsequent position.

9. An air vent system for a vehicle, comprising:
an air register assembly including a vane rotatably coupled to a frame, wherein the vane is operable between a first angle and a second angle, and wherein the frame is operable between a first position and a second position;
an actuation assembly operably coupled to each of the vane and the frame, wherein the actuation assembly adjusts the frame between the first and second positions, and wherein the actuation assembly adjusts the vane between the first and second angles;
an imager disposed proximate the air register assembly and defining a field of view, wherein the imager captures image data within the field of view; and
a controller communicatively coupled to the imager and the actuation assembly, wherein the controller is configured to determine an area that corresponds with an object, and wherein the controller activates the actuation assembly to adjust at least one of the vane and the frame in response to a user-selected position in the area to direct airflow to the user-selected position in the area.

10. The air vent system of claim 9, wherein the controller determines a change in position of the user-selected position in response to the image data.

11. The air vent system of claim 10, wherein the controller activates the actuation assembly in response to the change in position of the user-selected position, wherein the actuation assembly adjusts the air register assembly to direct the airflow to the user-selected position disposed in a subsequent position.

12. The air vent system of claim 9, further comprising:
a user interface communicatively coupled to the controller, wherein the user interface displays position information for at least one of the vane and the frame, and wherein the user interface displays position information for a central point of the area.

13. The air vent system of claim 9, further comprising:
an indicator light coupled to the vane, wherein the controller activates the indicator light when the vane is at a predefined angle.

14. The air vent system of claim 9, further comprising:
a sensor communicatively coupled to the controller, wherein the sensor senses at least one of sun load, ambient temperature, and interior temperature within said vehicle.

15. A method of operating a vehicle air vent system, comprising:
detecting a passenger disposed on a seating assembly within a field of view of an imager;
calculating an initial position of the passenger;
determining an aspect of the passenger;
determining an area that corresponds to the aspect of the passenger;
determining a central point of the area and assigning a coordinate value to the central point;
adjusting an air register assembly to direct airflow to the central point at the initial position;
calculating a subsequent position of the central point within the field of view;
adjusting the air register assembly to direct the airflow to the central point at the subsequent position via an actuation assembly;
adjusting at least one of a vane and a frame of the air register assembly in response to a user-selected position in the area to direct airflow to the user-selected position;
calculating a subsequent position of the user-selected position within the area; and
adjusting at least one of the vane and the frame of the air register assembly to direct the airflow to the user-selected position at the subsequent position.

16. The method of claim 15, further comprising:
sensing at least one of a sun load, an ambient temperature, and interior temperature within an interior compartment.

17. The method of claim 15, further comprising:
illuminating an indicator light when at least one of a vane of the air register assembly is at a predefined angle and a frame of the air register assembly is at a predefined position; and
displaying the coordinate value of the central point on a user interface.

\* \* \* \* \*